US012334010B2

(12) United States Patent
Lee et al.

(10) Patent No.: US 12,334,010 B2
(45) Date of Patent: Jun. 17, 2025

(54) DISPLAY DEVICE

(71) Applicant: Samsung Display Co., Ltd., Yongin-si (KR)

(72) Inventors: Donggyu Lee, Yongin-si (KR); Jae-Hyeon Jeon, Yongin-si (KR); Sehyuk Park, Yongin-si (KR); Jin-Wook Yang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/122,401

(22) Filed: Mar. 16, 2023

(65) Prior Publication Data

US 2023/0410741 A1 Dec. 21, 2023

(30) Foreign Application Priority Data

Jun. 10, 2022 (KR) ........................ 10-2022-0070556

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0819* (2013.01); *G09G 2300/0852* (2013.01); *G09G 2300/0861* (2013.01); *G09G 2310/08* (2013.01); *G09G 2320/0233* (2013.01); *G09G 2320/0247* (2013.01); *G09G 2320/0285* (2013.01)

(58) Field of Classification Search
CPC ............... G09G 3/3233; G09G 3/2096; G09G 2300/0819; G09G 2300/0852; G09G 2300/0861; G09G 2310/08; G09G 2320/0233; G09G 2320/0247; G09G 2320/0285; G09G 2310/0251; G09G 2340/0435; G09G 3/32; G09G 3/3406; G09G 2300/043; G09G 2300/0809; G09G 2310/0264
See application file for complete search history.

(56) References Cited

U.S. PATENT DOCUMENTS

| | | | | |
|---|---|---|---|---|
| 9,542,887 | B2 | 1/2017 | Pyo | |
| 10,380,943 | B2 | 8/2019 | Choi et al. | |
| 11,043,184 | B2 * | 6/2021 | An | G09G 5/003 |
| 11,138,952 | B2 * | 10/2021 | Lee | G09G 5/006 |

(Continued)

FOREIGN PATENT DOCUMENTS

| | | | |
|---|---|---|---|
| KR | 1020150114020 | A | 10/2015 |
| KR | 1020190043653 | A | 4/2019 |

(Continued)

*Primary Examiner* — Temesghen Ghebretinsae
*Assistant Examiner* — K. Kiyabu
(74) *Attorney, Agent, or Firm* — CANTOR COLBURN LLP

(57) ABSTRACT

A display device includes a light emitting element, a first transistor, and a second transistor connected between the first transistor and the light emitting element and including a gate electrode which receives an emission signal. One frame includes a first period a second period continuous with the first period. An emission off period of the emission signal has a first time duration during the first period, and the emission off period of the emission signal has a second time duration different from the first time duration during the second period.

15 Claims, 15 Drawing Sheets

(56) References Cited

U.S. PATENT DOCUMENTS

| | | | | |
|---|---|---|---|---|
| 11,302,251 | B2 | 4/2022 | Sung et al. | |
| 11,574,574 | B2 * | 2/2023 | Kim | G09G 3/20 |
| 11,670,212 | B2 * | 6/2023 | Lee | G09G 3/32 345/690 |
| 11,893,954 | B2 * | 2/2024 | Kim | G02F 1/136286 |
| 11,922,866 | B1 * | 3/2024 | Sohn | G09G 3/3233 |
| 11,948,498 | B2 * | 4/2024 | Kim | G09G 3/32 |
| 2005/0083280 | A1 * | 4/2005 | Hiraki | G09G 3/342 345/87 |
| 2015/0371609 | A1 * | 12/2015 | Choi | G06T 1/20 345/205 |
| 2017/0004766 | A1 * | 1/2017 | Cho | G06F 1/1652 |
| 2019/0014292 | A1 * | 1/2019 | Ishii | H10K 59/131 |
| 2020/0066215 | A1 * | 2/2020 | Koo | G09G 3/3426 |
| 2020/0193915 | A1 * | 6/2020 | Noh | G09G 3/3233 |
| 2021/0398508 | A1 | 12/2021 | Lee et al. | |
| 2023/0306890 | A1 * | 9/2023 | Cho | G09G 3/2092 |
| 2023/0401997 | A1 * | 12/2023 | Jeon | G09G 3/32 |
| 2024/0071273 | A1 * | 2/2024 | Bae | G09G 5/006 |

FOREIGN PATENT DOCUMENTS

| | | | |
|---|---|---|---|
| KR | 1020190063813 | A | 6/2019 |
| KR | 102317876 | B1 | 10/2021 |

* cited by examiner

FIG. 7

122

| Address | CNT | CV |
|---|---|---|
| 0x00 | 0 | 2 |
| 0x01 | 1 | 2 |
| 0x02 | 2 | 2 |
| 0x03 | 3 | 2 |
| 0x04 | 4 | 0 |
| 0x05 | 5 | 0 |
| 0x06 | 6 | 0 |
| 0x07 | 7 | 0 |
| 0x08 | 8 | -2 |
| 0x09 | 9 | -2 |
| ⋮ | ⋮ | ⋮ |

DISPLAY DEVICE

This application claims priority to Korean Patent Application No. 10-2022-0070556, filed on Jun. 10, 2022, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

Electronic devices, which provide images to users, such as a smart phone, a digital camera, a notebook computer, a navigation system, a monitor, and a smart television include a display device for displaying the images. The display device generates an image and provides the users with the generated image through a display screen.

The display device may include a plurality of pixels and driving circuits (e.g., a scan driving circuit, a data driving circuit, and an emission driving circuit) for controlling the plurality of pixels. Each of the plurality of pixels may include a display element and a pixel circuit for controlling the display element. The driving circuit of a pixel may include a plurality of transistors operatively connected to one another.

SUMMARY

A display device may be desired to operate at various operating frequencies to improve image quality.

Embodiments of the disclosure provide a display device capable of operating at various operating frequencies.

According to an embodiment, a display device includes a light emitting element, a first transistor, and a second transistor connected between the first transistor and the light emitting element and including a gate electrode which receives an emission signal. In such an embodiment, one frame includes a first period a second period continuous with the first period. In such an embodiment, an emission off period of the emission signal has a first time duration during the first period, and the emission off period of the emission signal has a second time duration different from the first time duration during the second period.

In an embodiment, the second transistor may be turned off during the emission off period of the emission signal.

In an embodiment, the second time duration may be shorter than the first time duration.

In an embodiment, the display device may further include a driving controller which outputs an emission control signal in response to a first synchronization signal and a second synchronization signal, and an emission driving circuit which outputs the emission signal in response to the emission control signal.

In an embodiment, the driving controller may include a counter which operates in response to the first synchronization signal and the second synchronization signal and outputs a count signal, a lookup table which stores a compensation value, a selector which outputs the compensation value corresponding to the count signal as a deviation value, an adder which adds an initial value and the deviation value and outputs an emission off control signal, and a control signal generator which outputs the emission control signal in response to the emission off control signal.

In an embodiment, the counter may be reset in response to the first synchronization signal and may count up in response to the second synchronization signal.

In an embodiment, the one frame may include a plurality of driving cycles. In such an embodiment, the first synchronization signal may indicate a start of the one frame, and the second synchronization signal may indicate a start of each of the plurality of driving cycles.

In an embodiment, the first period may correspond to a part of the plurality of driving cycles, and the second period may correspond to another part of the plurality of driving cycles.

In an embodiment, the display device may further include a memory that stores the initial value.

In an embodiment, when an operating frequency is the first frequency, the one frame may include the first period and the second period. In such an embodiment, when the operating frequency is a second frequency lower than the first frequency, the one frame may include the first period, the second period, and a third period continuous with the second period. In such an embodiment, the emission off period of the emission signal during the third period may have a third time duration different from the first time duration and the second time duration.

According to an embodiment, a display device includes a display panel including a pixel connected to a scan line, an emission control line, and a data line, a scan driving circuit which outputs a scan signal to the scan line, an emission driving circuit which outputs an emission signal to the emission control line, and a driving controller which provides a scan control signal to the scan driving circuit and provides an emission control signal to the emission driving circuit. In such an embodiment, one frame includes a write cycle and a plurality of hold cycles. The driving controller outputs the emission control signal in a way such that an emission off period of the emission signal has a first time duration during the write cycle and at least one hold cycle of the plurality of hold cycles, and the emission off period of the emission signal has a second time duration different from the first time duration during the remaining hold cycles of the plurality of hold cycles.

In an embodiment, the pixel may include a light emitting element, a first transistor, and a second transistor connected between the first transistor and the light emitting element and including a gate electrode which receives the emission signal.

In an embodiment, the second transistor may be turned off during the emission off period of the emission signal.

In an embodiment, during the write cycle and each of the plurality of hold cycles, the emission signal may include the emission off period for turning off the second transistor and a turn-on period for turning on the second transistor.

In an embodiment, the second time duration may be shorter than the first time duration.

In an embodiment, the driving controller may further include an emission controller that outputs the emission control signal in response to a first synchronization signal and a second synchronization signal, and an emission driving circuit that outputs the emission signal in response to the emission control signal.

In an embodiment, the emission controller may include a counter which operates in response to the first synchronization signal and the second synchronization signal and outputs a count signal, a lookup table which stores a compensation value, a selector which outputs the compensation value corresponding to the count signal as a deviation value, an adder which adds an initial value and the deviation value and outputs an emission off control signal, and a control signal generator which outputs the emission control signal in response to the emission off control signal.

In an embodiment, the counter may be reset in response to the first synchronization signal and may count up in response to the second synchronization signal.

In an embodiment, the first synchronization signal may indicate a start of one frame, and the second synchronization signal may indicate a start of the write cycle or a start of each of the plurality of hold cycles.

In an embodiment, the emission controller may further include a memory which stores the initial value.

BRIEF DESCRIPTION OF THE DRAWINGS

The above and other features of embodiments of the disclosure will become apparent by describing in detail embodiments thereof with reference to the accompanying drawings, in which:

FIG. 7 shows a compensation value stored in a lookup table;

DETAILED DESCRIPTION

Figure 1:
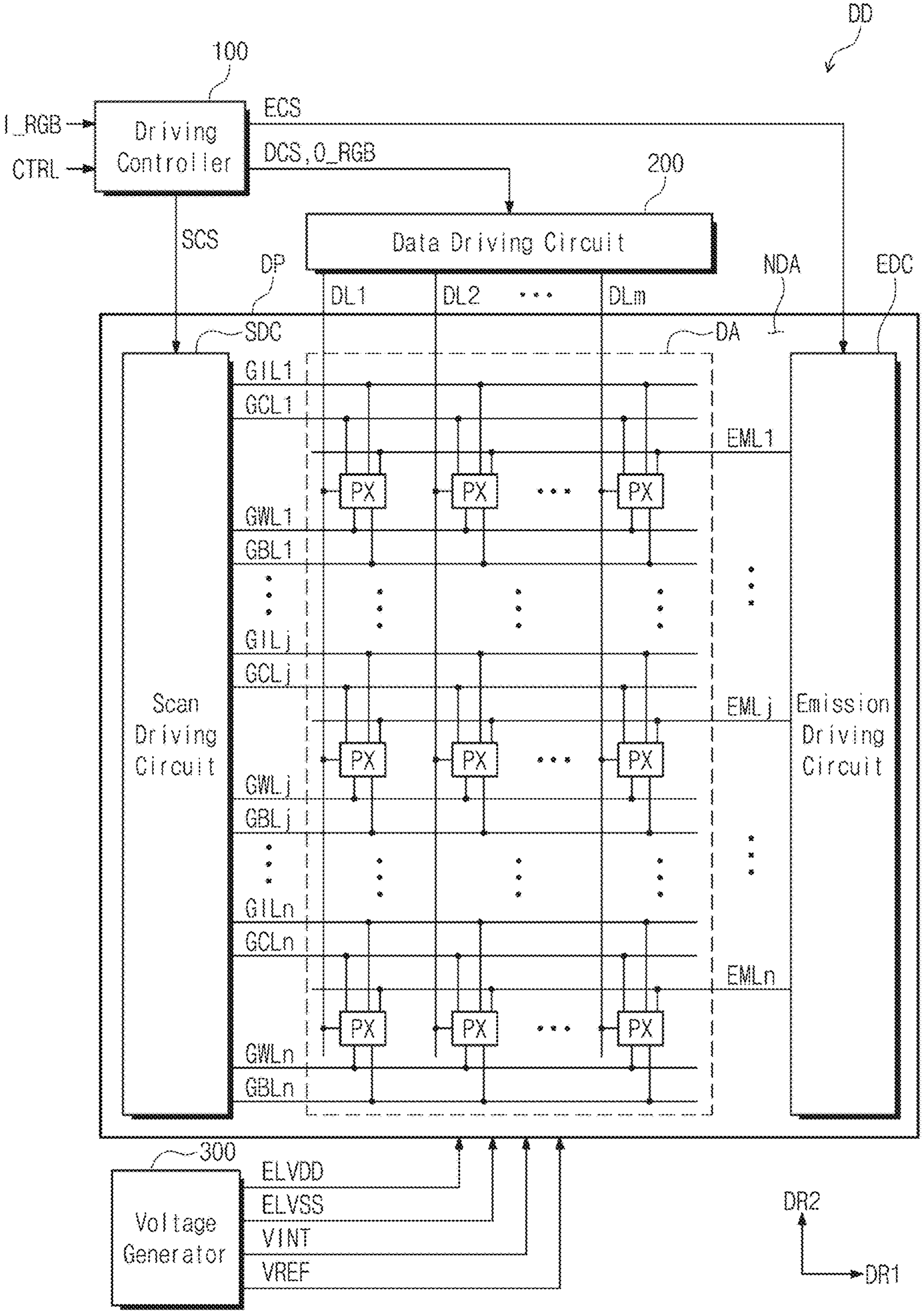
FIG. 1 is a block diagram of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components throughout. Also, in drawings, the thickness, ratio, and dimension of components are exaggerated for effectiveness of description of technical contents.

The terms "first", "second", etc. are used to describe various components, but the components are not limited by the terms. The terms are used only to differentiate one component from another component. For example, without departing from the scope and spirit of the disclosure, a first component may be referred to as a second component, and similarly, the second component may be referred to as the first component.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Also, the terms "under", "beneath", "on", "above", etc. are used to describe a relationship between components illustrated in a drawing. The terms are relative and are described with reference to a direction indicated in the drawing.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms and scientific terms) used in this specification have the same meaning as commonly understood by those skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments are described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the disclosure will be described in detail with reference to the accompanying drawings.

FIG. 1 is a block diagram of a display device, according to an embodiment of the disclosure.

Referring to FIG. 1, an embodiment of a display device DD includes a display panel DP, a driving controller 100, a data driving circuit 200, and a voltage generator 300.

The driving controller 100 receives an input image signal I_RGB and a control signal CTRL. The input image signal I_RGB and the control signal CTRL may be provided from an external processor (e.g., an application processor, a graphic processor, a main processor, or the like).

The driving controller 100 outputs an output image signal O_RGB based on the input image signal I_RGB. The driving controller 100 outputs a scan control signal SCS, a data control signal DCS, and an emission control signal ECS based on the control signal CTRL.

The driving controller 100 according to an embodiment of the disclosure may determine an operating frequency based on the control signal CTRL and may output the scan control signal SCS, the data control signal DCS, and the emission control signal ECS corresponding to the determined operating frequency.

The data driving circuit 200 receives the data control signal DCS and the output image signal O_RGB from the driving controller 100. The data driving circuit 200 converts the output image signal O_RGB into data signals and outputs the data signals to a plurality of data lines DL1 to DLm to be described later. The data signals refer to analog voltages corresponding to a grayscale level of the output image signal O_RGB.

The voltage generator 300 generates voltages used to operate the display panel DP. In an embodiment, the voltage generator 300 generates a first driving voltage ELVDD, a second driving voltage ELVSS, a reference voltage VREF, and an initialization voltage VINT.

The display panel DP includes scan lines GIL1 to GILn, GCL1 to GCLn, and GWL1 to GWLn, and GBL1 to GBLn, emission control lines EML1 to EMLn, the data lines DL1 to DLm, and pixels PX. The display panel DP may further include a scan driving circuit SDC and an emission driving circuit EDC.

In an embodiment, the pixels PX may be positioned in a display area DA. The scan driving circuit SDC and the emission driving circuit EDC may be positioned in a non-display area NDA.

In an embodiment, the scan driving circuit SDC is arranged on a first side of the display panel DP. The scan lines GIL1 to GILn, GCL1 to GCLn, GWL1 to GWLn, and GBL1 to GBLn extend from the scan driving circuit SDC in a first direction DR1.

The emission driving circuit EDC is arranged on a second side of the display panel DP. The emission control lines EML1 to EMLn extend from the emission driving circuit EDC in a direction opposite to the first direction DR1. The emission driving circuit EDC may output emission signals to the emission control lines EML1 to EMLn in response to the emission control signal ECS.

The scan lines GIL1 to GILn, GCL1 to GCLn, GWL1 to GWLn, and GBL1 to GBLn and the emission control lines EML1 to EMLn are arranged to be spaced from one another in a second direction DR2. The data lines DL1 to DLm extend from the data driving circuit 200 in a direction opposite to the second direction DR2, and are arranged spaced from one another in the first direction DR1.

In an embodiment, as shown in FIG. 1, the scan driving circuit SDC and the emission driving circuit EDC may be arranged to face each other with the pixels PX interposed therebetween, but the disclosure is not limited thereto. In an alternative embodiment, for example, the scan driving circuit SDC and the emission driving circuit EDC may be positioned adjacent to each other on one of the first side and the second side of the display panel DP. In an embodiment, the scan driving circuit SDC and the emission driving circuit EDC may be implemented with one circuit.

The display panel DP includes the scan lines GIL1 to GILn, GCL1 to GCLn, and GWL1 to GWLn, and GBL1 to GBLn, the emission control lines EML1 to EMLn, and the data lines DL1 to DLm. Each of the plurality of pixels PX may be electrically connected to four scan lines and one emission control line. In an embodiment, for example, as shown in FIG. 1, a first row of pixels PX may be connected to the scan lines GILL GCL1, GWL1, and GBL1 and the emission control line EML1. In such an embodiment, a j-th row of pixels may be connected to the scan lines GILj, GCLj, GWLj, and GBLj and the emission control line EMLj.

Each of the plurality of pixels PX includes a light emitting element ED (see FIG. 2) and a pixel circuit PXC (see FIG. 2) for controlling the emission of the light emitting element ED. The pixel circuit PXC may include one or more transistors and one or more capacitors. The scan driving circuit SDC and the emission driving circuit EDC may include transistors formed through a same process as the pixel circuit PXC.

Each of the plurality of pixels PX receives the first driving voltage ELVDD, the second driving voltage ELVSS, the reference voltage VREF, and the initialization voltage VINT from the voltage generator 300.

The scan driving circuit SDC receives the scan control signal SCS from the driving controller 100. The scan driving circuit SDC may output scan signals to the scan lines GIL1 to GILn, GCL1 to GCLn, GWL1 to GWLn, and GBL1 to GBLn in response to the scan control signal SCS.

Figure 2:
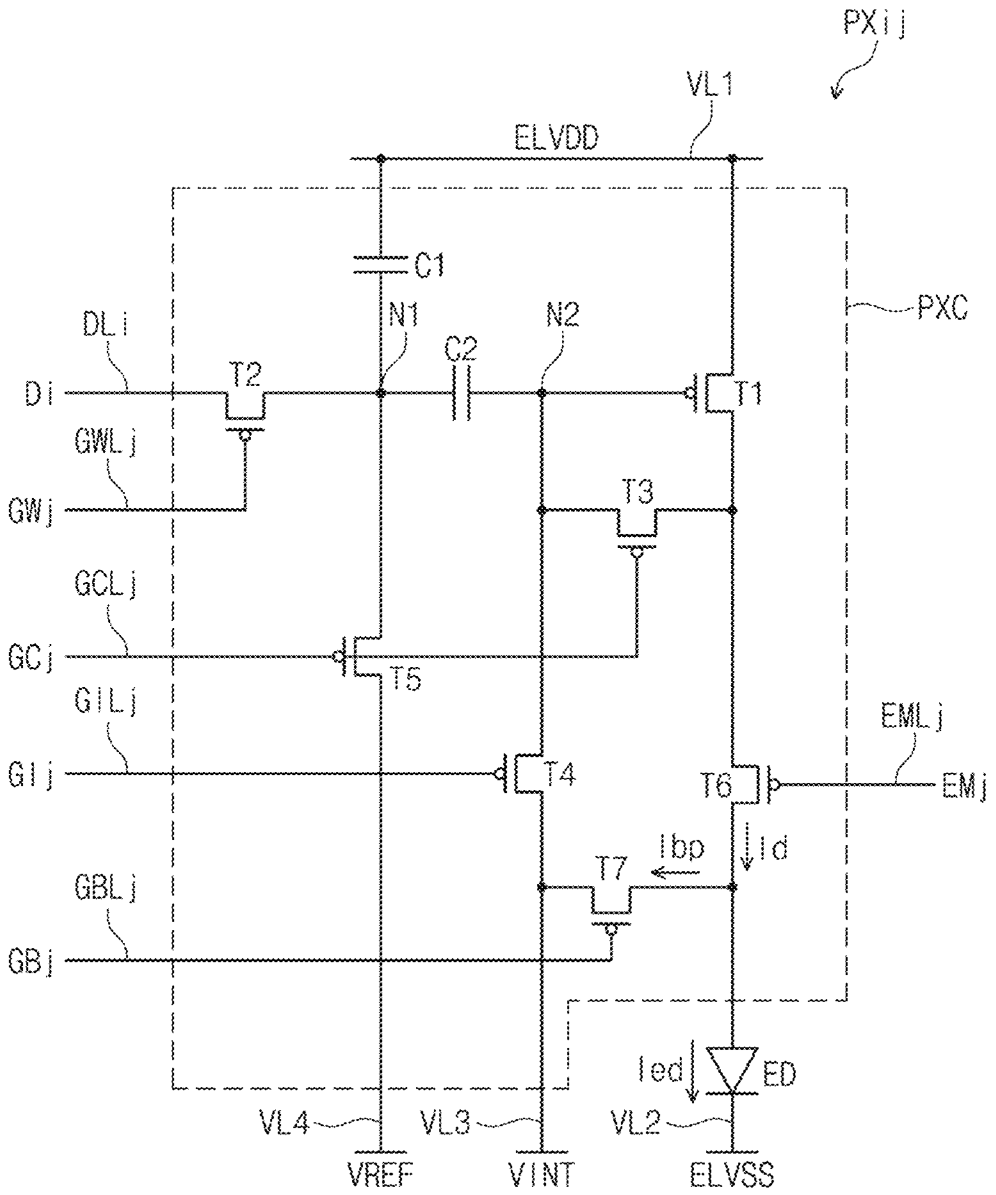
FIG. 2 is an equivalent circuit diagram of a pixel, according to an embodiment of the disclosure.

FIG. 2 is an equivalent circuit diagram of a pixel, according to an embodiment of the disclosure.

FIG. 2 illustrates an equivalent circuit diagram of an embodiment of a pixel PXij connected to the i-th data line DLi among the data lines DL1 to DLm, the j-th scan lines GILj, GCLj, GWLj, and GBLj among the scan lines GIL1 to GILn, GCL1 to GCLn, GWL1 to GWLn, and GBL1 to GBLn and the j-th emission control line EMLj among the emission control lines EML1 to EMLn, which are illustrated in FIG. 1.

Each of the plurality of pixels PX shown in FIG. 1 may have a same circuit configuration as the equivalent circuit diagram of the pixel PXij shown in FIG. 2.

Referring to FIG. 2, the pixel PXij according to an embodiment includes a pixel circuit PXC and at least one light emitting element ED. The pixel circuit PXC includes first to seventh transistors T1, T2, T3, T4, T5, T6, and T7 and a first capacitor C1 and a second capacitor C2. The light emitting element ED may be a light emitting diode. Hereinafter, for convenience of description, embodiments where each pixel PXij includes a single light emitting element ED will be described.

Each of the first to seventh transistors T1 to T7 is a P-type transistor having a low-temperature polycrystalline silicon (LTPS) semiconductor layer. However, the disclosure is not limited thereto. In an alternative embodiment, the first to seventh transistors T1 to T7 may be N-type transistors by using an oxide semiconductor as a semiconductor layer. In another alternative embodiment, at least one of the first to seventh transistors T1 to T7 may be an N-type transistor, and the other(s) thereof may be P-type transistors. Moreover, the circuit configuration of a pixel according to an embodiment of the disclosure is not limited to FIG. 2. The pixel circuit PXC illustrated in FIG. 2 is only an example. In an alternative embodiment, for example, the configuration of the pixel circuit PXC may be modified and implemented.

The scan lines GILj, GCLj, GWLj, and GBLj may deliver scan signals GIj, GCj, GWj, and GBj, respectively. The emission control line EMLj may deliver an emission signal EMj. The data line DLi transfers a data signal Di. The data signal Di may have a voltage level corresponding to the output image signal O_RGB output from the driving controller 100 (see FIG. 1). First to fourth driving voltage lines VL1, VL2, VL3, and VL4 may deliver the first driving voltage ELVDD, the second driving voltage ELVSS, the initialization voltage VINT, and the reference voltage VREF, respectively.

The first capacitor C1 is connected between the first driving voltage line VL1 and a first node N1. The second capacitor C2 is connected between the first node N1 and a second node N2.

The first transistor T1 includes a first electrode connected to the first driving voltage line VL1, a second electrode electrically connected to an anode of the light emitting element ED via the sixth transistor T6, and a gate electrode electrically connected to the second node N2. The first transistor T1 may receive the data signal Di, which is delivered through the data line DLi based on a switching operation of the second transistor T2, at the gate electrode through the second capacitor C2 and then may supply a driving current Id to the light emitting element ED.

The second transistor T2 includes a first electrode connected to the data line DLi, a second electrode connected to the first node N1, and a gate electrode connected to the scan line GWLj. The second transistor T2 may be turned on in response to the scan signal GWj received through the scan line GWLj and then may deliver the data signal Di delivered from the data line DLi to the first node N1.

The third transistor T3 includes a first electrode connected to the second electrode of the first transistor T1, a second electrode connected to the second node N2, that is, the gate electrode of the first transistor T1, and a gate electrode connected to the scan line SCLj. The third transistor T3 may be turned on in response to the scan signal GCj transferred through the scan line GCLj, and thus, the gate electrode and the second electrode of the first transistor T1 may be connected, that is, the first transistor T1 may be diode-connected.

The fourth transistor T4 includes a first electrode connected to the second node N2, a second electrode connected to the third driving voltage line VL3, through which the initialization voltage VINT is supplied, and a gate electrode connected to the scan line GILj. The fourth transistor T4 may be turned on in response to the scan signal GIj transferred through the scan line GILj such that the initialization voltage VINT is transferred to the gate electrode of the first transistor T1. As such, a voltage of the gate electrode of the first transistor T1 may be initialized. This operation may be referred to as an "an initialization operation".

The fifth transistor T5 includes a first electrode connected to the first node N1, a second electrode connected to the fourth driving voltage line VL4, through which the reference voltage VREF is delivered, and a gate electrode connected to the scan line GCLj. The fifth transistor T5 may be turned on in response to the scan signal GCj received through the scan line GCLj to deliver the reference voltage VREF to the first node N1.

The sixth transistor T6 includes a first electrode connected with the second electrode of the first transistor T1, a second electrode connected with the anode of the light emitting element ED, and a gate electrode connected with the emission control line EMLj.

The sixth transistor T6 may be turned on in response to the emission signal EMj received through the emission control line EMLj. As the sixth transistor T6 is turned on, a current path may be formed between the first driving voltage line VL1 and the light emitting element ED through the first transistor T1 and the sixth transistor T6.

The seventh transistor T7 includes a first electrode connected to the anode of the light emitting element ED, a second electrode connected to the third driving voltage line VL3, and a gate electrode connected to the scan line GBLj. The seventh transistor T7 is turned on based on the scan signal GBj received through the scan line GBLj, and bypasses a current of the anode of the light emitting element ED to the third voltage line VL3.

The light emitting element ED includes the anode connected to the second electrode of the sixth transistor T6 and a cathode connected to the second driving voltage line VL2.

Figure 3A:
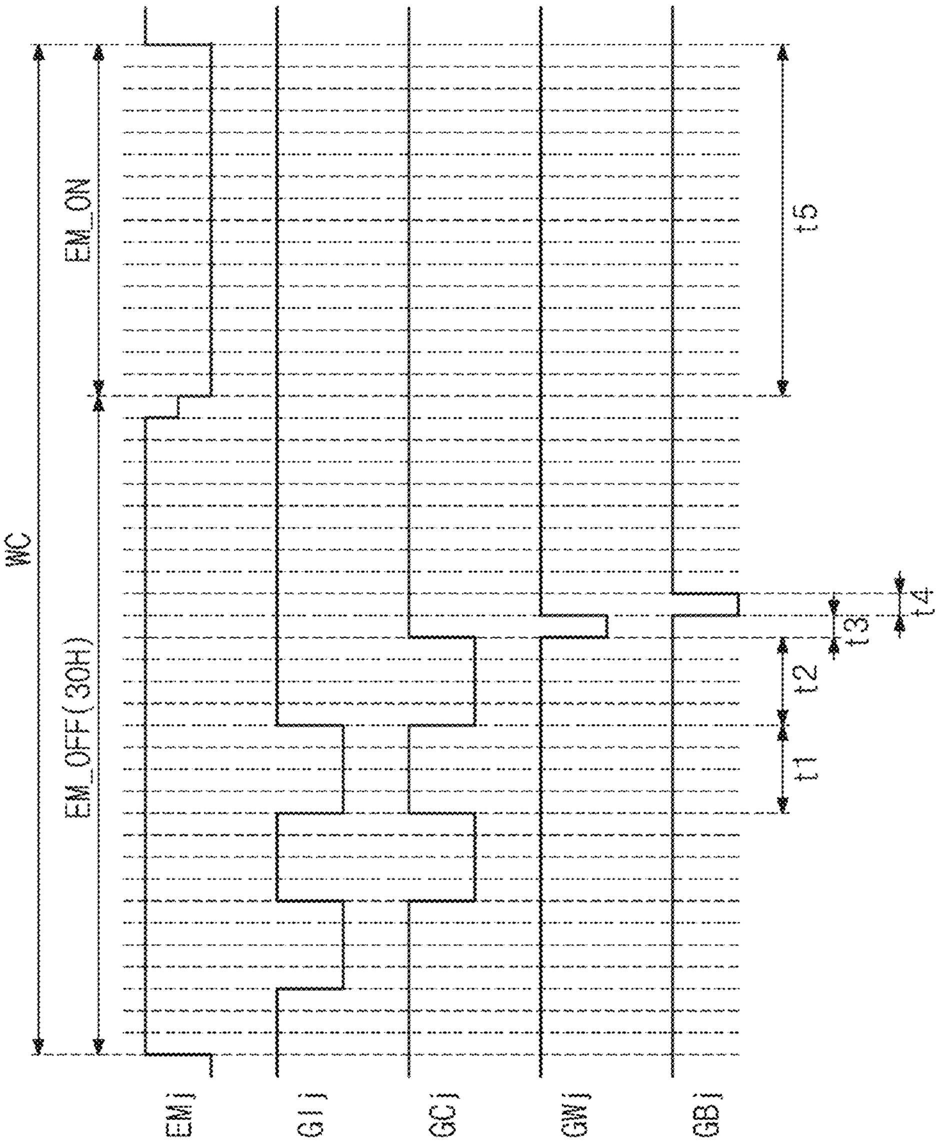
FIGS. 3A and 3B are timing diagrams for describing an operation of a pixel illustrated in FIG. 2.
Figure 3B:
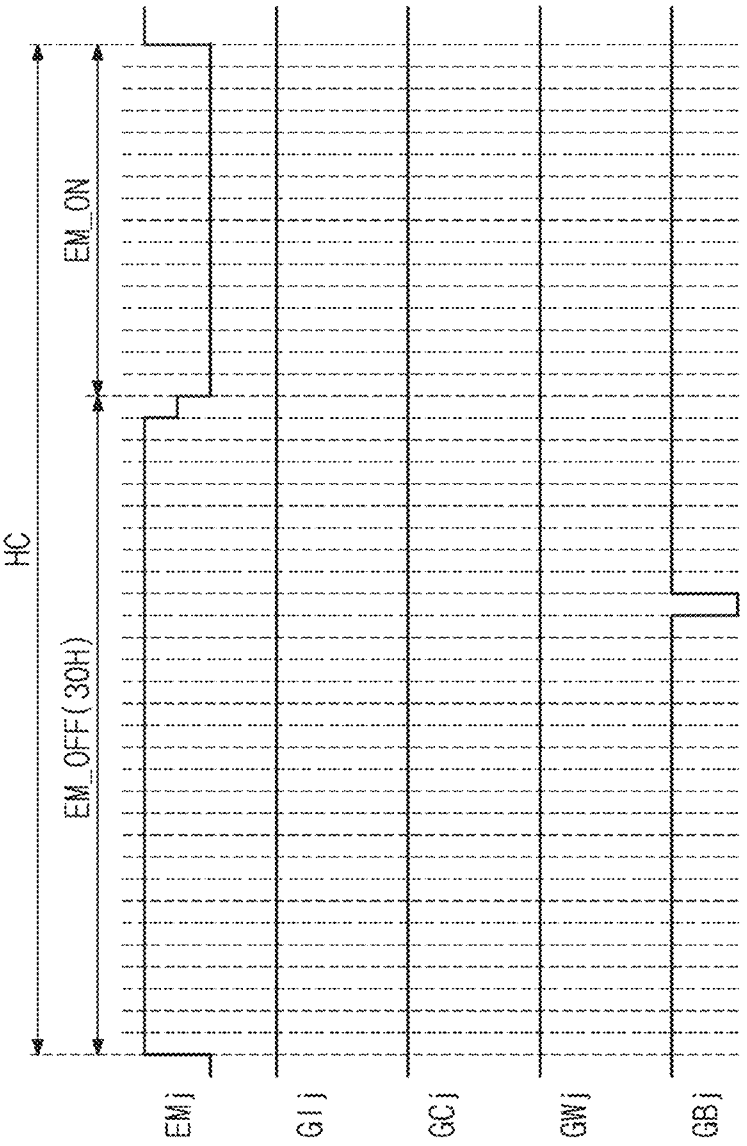

FIGS. 3A and 3B are timing diagrams for describing an operation of a pixel illustrated in FIG. 2.

Referring to FIGS. 2, 3A and 3B, in an embodiment, one frame may include one or more driving cycles. In an embodiment, one frame may include one driving cycle, that is, one write cycle WC. In an embodiment, one frame may include the one write cycle WC and one or more hold cycles HC. The number of write cycles WC and the number of hold cycles HC in one frame may vary depending on an operating frequency.

FIG. 3A shows scan signals and an emission signal provided to the pixel PXij in the write cycle WC, and FIG. 3B shows scan signals and an emission signal provided to the pixel PXij in the hold cycle HC.

Referring to FIGS. 2 and 3A, the scan signal GIj having a low level is provided through the scan line GILj during an initialization period t1. When the fourth transistor T4 is turned on in response to the scan signal GIj having a low level, the initialization voltage VINT is supplied to the gate electrode of the first transistor T1 through the fourth transistor T4 to initialize the first transistor T1.

Next, when the scan signal GCj having a low level is supplied through the scan line GCLj during a compensation duration t2, the third transistor T3 is turned on. The first transistor T1 is diode-connected by the third transistor T3 turned on and is forward-biased. Accordingly, the potential of the second node N2 may be set to a difference (ELVDD−Vth) between the first driving voltage ELVDD and a threshold voltage (referred to as "Vth") of the first transistor T1.

Furthermore, the second transistor T5 is turned on by the scan signal GCj having a low level. The reference voltage VREF is supplied to the first node N1 by the fifth transistor T5 turned on.

The initialization duration t1 and the compensation duration t2 within one frame may be repeated twice or more to minimize the influence of the data signal Di during the previous frame in the pixel PXij.

During a programming duration t3, the scan signal GWj having a low level is provided through the scan line GWLj. The second transistor T2 is turned on in response to the scan signal GWj having a low level, and thus the data signal Di is delivered to the first node N1 through the second transistor T2. When the data signal Di is delivered to the first node N1, the potential of the second node N2 increases by a voltage level of the data signal Di. In the case, a compensation voltage, which is obtained by reducing the voltage of the data signal Di supplied from the data line DLi by the threshold voltage (Vth) of the first transistor T1, is applied to the gate electrode of the first transistor T1. That is, a gate voltage applied to the gate electrode of the first transistor T1 may be a compensation voltage.

During a bypass duration t4, the seventh transistor T7 is turned on by receiving the scan signal GBj having a low level through the scan line GBLj. A part of the driving current Id may be drained through the seventh transistor T7 as the bypass current Ibp.

When the light emitting element ED emits light under the condition that a minimum current of the first transistor T1 flows as a driving current for the purpose of displaying a black image, the black image may not be normally displayed. Accordingly, the seventh transistor T7 in the pixel PXij according to an embodiment of the disclosure may drain (or disperse) a part of the minimum current of the first transistor T1 to a current path, which is different from a current path to the light emitting element ED, as the bypass current Ibp. Herein, the minimum current of the first transistor T1 means a current flowing under the condition that a gate-source voltage of the first transistor T1 is smaller than the threshold voltage, that is, the first transistor T1 is turned off. As a minimum driving current is transferred to the light emitting element ED with the first transistor T1 turned off, an image of black luminance is expressed. When the minimum driving current for displaying a black image flows, the influence of a bypass transfer of the bypass current Ibp may be great. On the other hand, when a large driving current for displaying an image such as a normal image or a white image flows, there may be almost no influence of the bypass current Ibp. Accordingly, when a driving current for displaying a black image flows, a light emitting current Ted of the light emitting element ED, which corresponds to a result of subtracting the bypass current Ibp drained through the sixth transistor T7 from the driving current Id, may have a minimum current amount to such an extent as to accurately express a black image. Accordingly, a contrast ratio may be improved by implementing an accurate black luminance image by using the seventh transistor T7. In an embodiment, the bypass signal is the scan signal GBj having a low level, but is not necessarily limited thereto.

Next, during an emission duration t5, the sixth transistor T6 is turned on by the emission signal EMj having a low level. In the emission duration t5, the driving current Id corresponding to a voltage difference between the gate voltage of the gate electrode of the first transistor T1 and the first driving voltage ELVDD is generated and supplied to the light emitting element ED through the sixth transistor T6, and the current Ted flows through the light emitting element ED.

While the emission signal EMj is at a high level, the sixth transistor T6 is turned off, and the light emitting element ED does not emit light. A period during which the emission signal EMj is at a high level may be an emission off period EM_OFF. While the emission signal EMj is at a low level, the sixth transistor T6 may be turned on, and the light emitting element ED may emit light by the driving current Id. A period during which the emission signal EMj is at a low level may be an emission on period EM_ON. The emission on period EM_ON may be equal (or corresponding) to the emission duration t5.

In an embodiment, each of the programming duration t3 and the bypass duration t4 may be one horizontal period 1H. In an embodiment, as shown in FIG. 3A, the emission off period EM_OFF is 30 horizontal periods 30H. In an embodiment, the emission off period EM_OFF may vary depending on an operating frequency. In an embodiment, for example, when the emission off period EM_OFF decreases, the emission on period EM_ON within one frame Fs may increase.

Referring to FIGS. 2 and 3B, in the hold cycle HC, the scan signals GIj, GCj, and GWj provided to the pixel PXij are maintained at an inactive level (e.g., a high level).

In the hold cycle HC, the emission signal EMj may include the emission off period EM_OFF and the emission on period EM_ON.

Figure 4A:
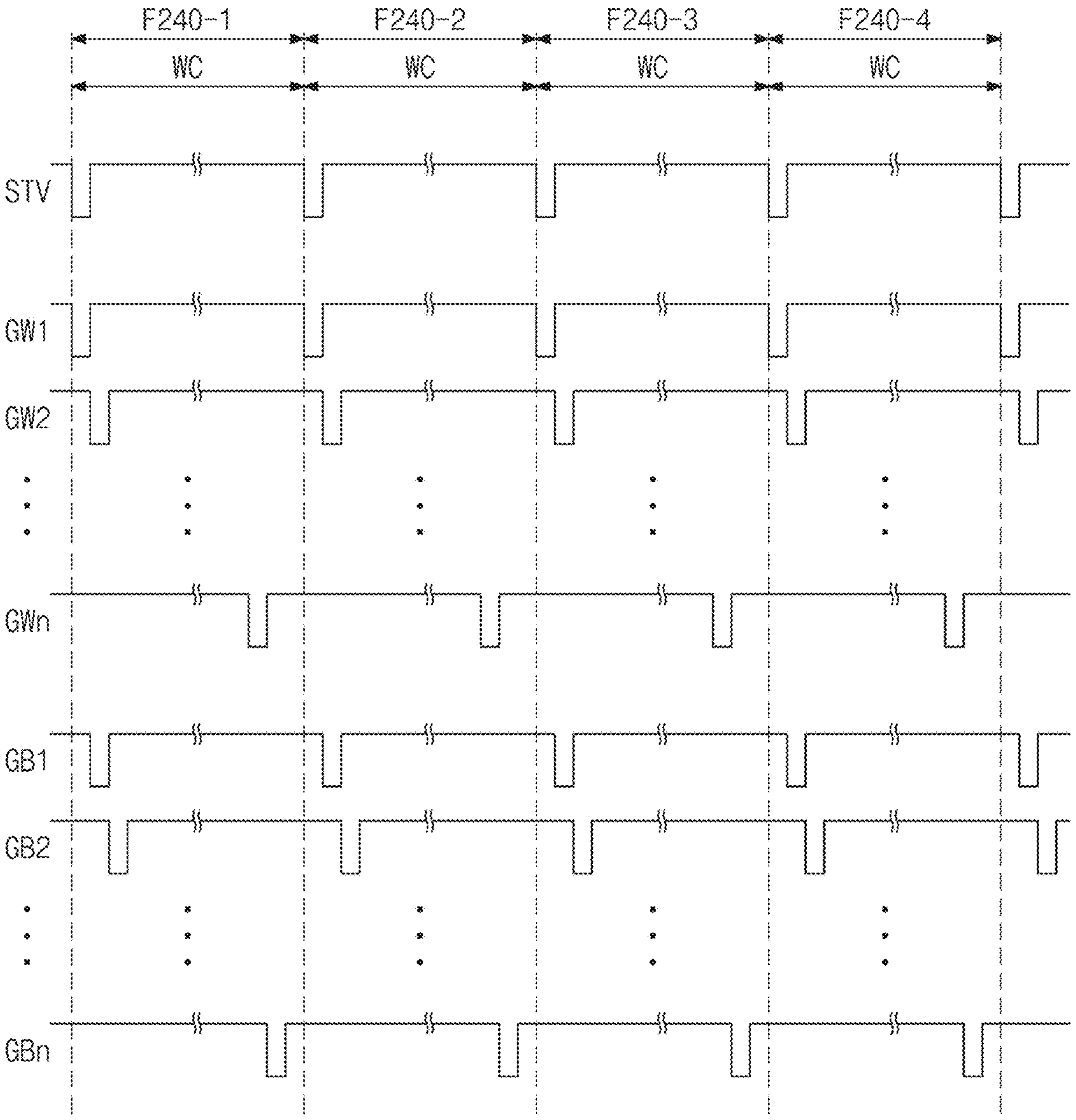
FIGS. 4A, 4B, and 4C are timing diagrams for describing an operation of a display device.
Figure 4B:
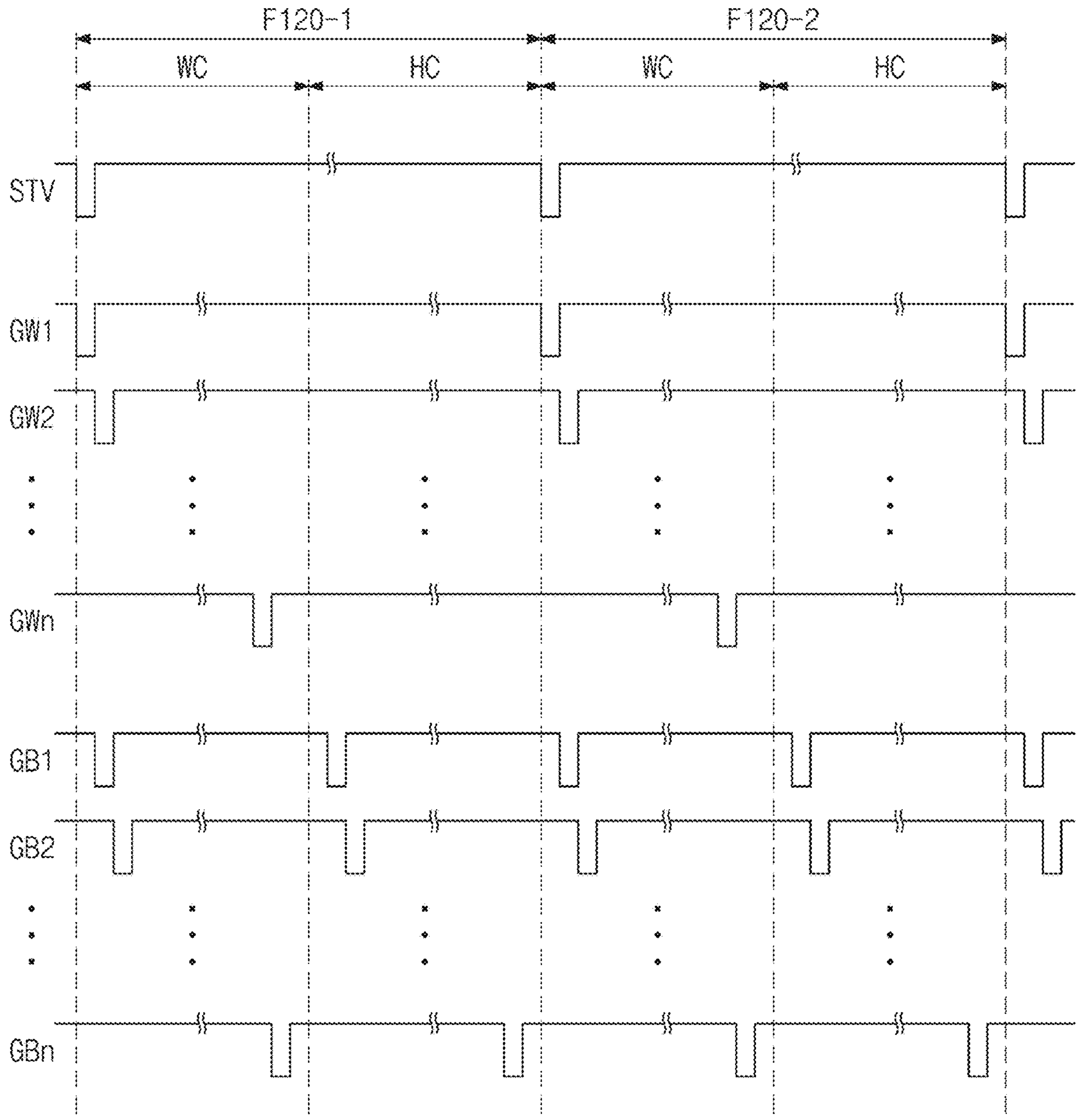
Figure 4C:
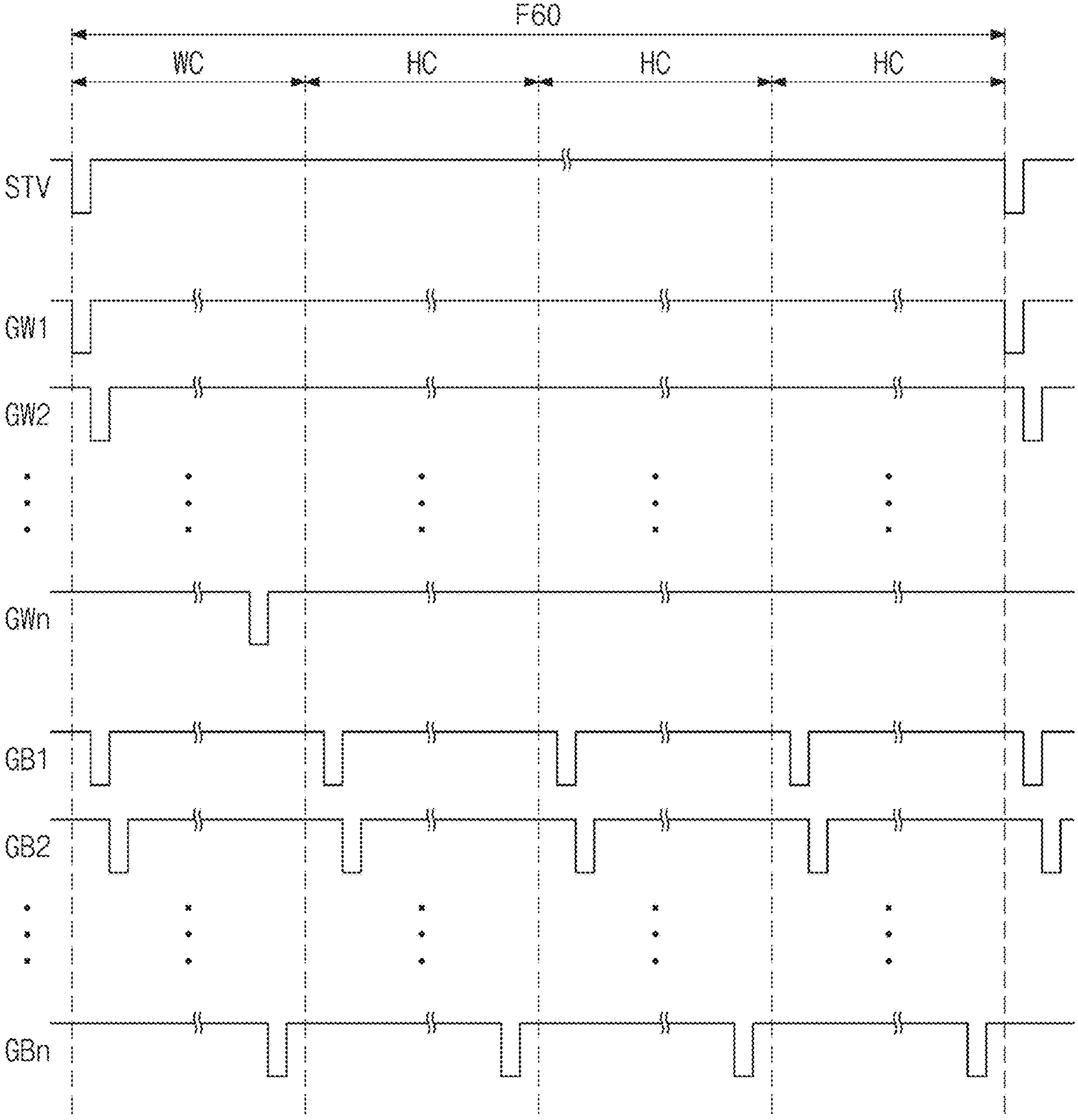

FIGS. 4A, 4B, and 4C are timing diagrams for describing an operation of a display device.

Referring to FIGS. 1, 2, 4A, 4B, and 4C, for convenience of description, a case where an embodiment of the display device DD operates at a first frequency (e.g., 240 Hz), a second frequency (e.g., 120 Hz), and a third frequency (e.g., 60 Hz) will be described. However, the disclosure is not limited thereto. In embodiments, the operating frequency of the display device DD may be changed in various manners. In an embodiment, the operating frequency of the display device DD may be selected as one of the first frequency, the second frequency, and the third frequency. in an embodiment, the display device DD may not set the operating frequency to a specific frequency during an operation, but may change the operating frequency to one of the first to third frequencies at any time. In an embodiment, the operating frequency of the display device DD may be determined based on the frequency of the input image signal I_RGB. In an embodiment, the operating frequency of the display device DD may be set to the maximum frequency, at which the display panel DP is capable of operating, regardless of the frequency of the input image signal I_RGB.

The driving controller 100 provides the scan control signal SCS to the scan driving circuit SDC. The scan control signal SCS may include information about the operating frequency of the display device DD. The scan driving circuit SDC may output the scan signals GC1 to GCn, GI1 to GIn, GW1 to GWn, and GB1 to GBn corresponding to the operating frequency in response to the scan control signal SCS. The scan control signal SCS may include a start signal STV. The start signal STV may be a signal indicating the start of one frame.

FIG. 4A is a timing diagram of a start signal and scan signals when an operating frequency of the display device DD is a first frequency (e.g., 240 Hz).

Referring to FIGS. 1 and 4A, when the operating frequency is a first frequency (e.g., 240 Hz), during each of frames F240-1, F240-2, F240-3, and F240-4, the scan driving circuit SDC sequentially activates the scan signals GW1 to GWn to a low level and sequentially activates scan signals GB1 to GBn to a low level. For convenience of illustration, only the scan signals GW1 to GWn and GB1 to GBn are shown in FIG. 4A. However, it would be understood that the scan signals GI1 to Gin and GC1 to GCn and the emission signals EM1 to EMn may also be sequentially activated during each of the frames F240-1, F240-2, F240-3, and F240-4. As the scan signals GW1 to GWn are sequentially activated to low levels during each of the frames F240-1, F240-2, F240-3, and F240-4, data signals delivered through the data lines DL1 to DLm may be provided to pixels PX. Each of the frames F240-1, F240-2, F240-3, and F240-4, in each of which data signals are provided to the pixels PX, may be one driving cycle, that is, the one write cycle WC.

FIG. 4B is a timing diagram of a start signal and scan signals when an operating frequency of the display device DD is a second frequency (e.g., 120 Hz).

Referring to FIGS. 1 and 4B, when an operating frequency is a second frequency (e.g., 120 Hz), the period (or duration) of each of frames F120-1 and F120-2 may be twice the period of each of the frames F240-1, F240-2, F240-3, and F240-4 shown in FIG. 4A. Each of the frames F120-1 and F120-2 may include two driving cycles, the one write cycle WC and the one hold cycle HC. During the write cycle WC, the scan driving circuit SDC sequentially activates the scan signals GW1 to GWn to low levels, and sequentially activates the scan signals GB1 to GBn to low levels. For convenience of illustration, FIG. 4B illustrates only the scan signals GW1 to GWn and GB1 to GBn. However, it would be understood that the scan signals GI1 to GIn and GC1 to GCn and the emission signals EM1 to EMn may also be sequentially activated in the write cycle WC of each of the frames F120-1 and F120-2.

During the hold cycle HC, the scan driving circuit SDC may maintain the scan signals GW1 to GWn at inactive levels (e.g., high levels) and may sequentially activate the scan signals GB1 to GBn.

Although not illustrated in FIG. 4B, the scan driving circuit SDC may maintain the scan signals GI1 to Gin and GC1 to GCn at inactive levels (e.g., high levels) during the hold cycle HC. During the hold cycle HC, the emission driving circuit EDC may sequentially activate the emission signals EM1 to EMn.

FIG. 4C is a timing diagram of a start signal and scan signals when an operating frequency of the display device DD is a third frequency (e.g., 60 Hz).

Referring to FIGS. 1 and 4C, when an operating frequency is a third frequency (e.g., 60 Hz), the period of a frame F60 may be twice the period of each of the frames F120-1 and F120-2 shown in FIG. 4B. The period of the frame F60 may be four times the period of each of the frames F240-1, F240-2, F240-3, and F240-4 shown in FIG. 4A.

The frame F60 may include four driving cycles, that is, the one write cycle WC and the three hold cycles HC. During the write cycle WC, the scan driving circuit SDC sequentially activates the scan signals GW1 to GWn to low levels, and sequentially activates the scan signals GB1 to GBn to low levels. For convenience of illustration, FIG. 4C illustrates only the scan signals GW1 to GWn and GB1 to GBn. However, it would be understood that the scan signals GI1 to GIn and GC1 to GCn and the emission signals EM1 to EMn may also be sequentially activated in the write cycle WC of the frame F60.

During each of the hold cycles HC, the scan driving circuit SDC may maintain the scan signals GW1 to GWn at inactive levels (e.g., high levels) and may sequentially activate the scan signals GB1 to GBn.

Although not illustrated in FIG. 4C, the scan driving circuit SDC may maintain the scan signals GI1 to Gin and GC1 to GCn at inactive levels (e.g., high levels) during each of the hold cycles HC. During the hold cycle HC, the emission driving circuit EDC may sequentially activate the emission signals EM1 to EMn.

Figure 5A:
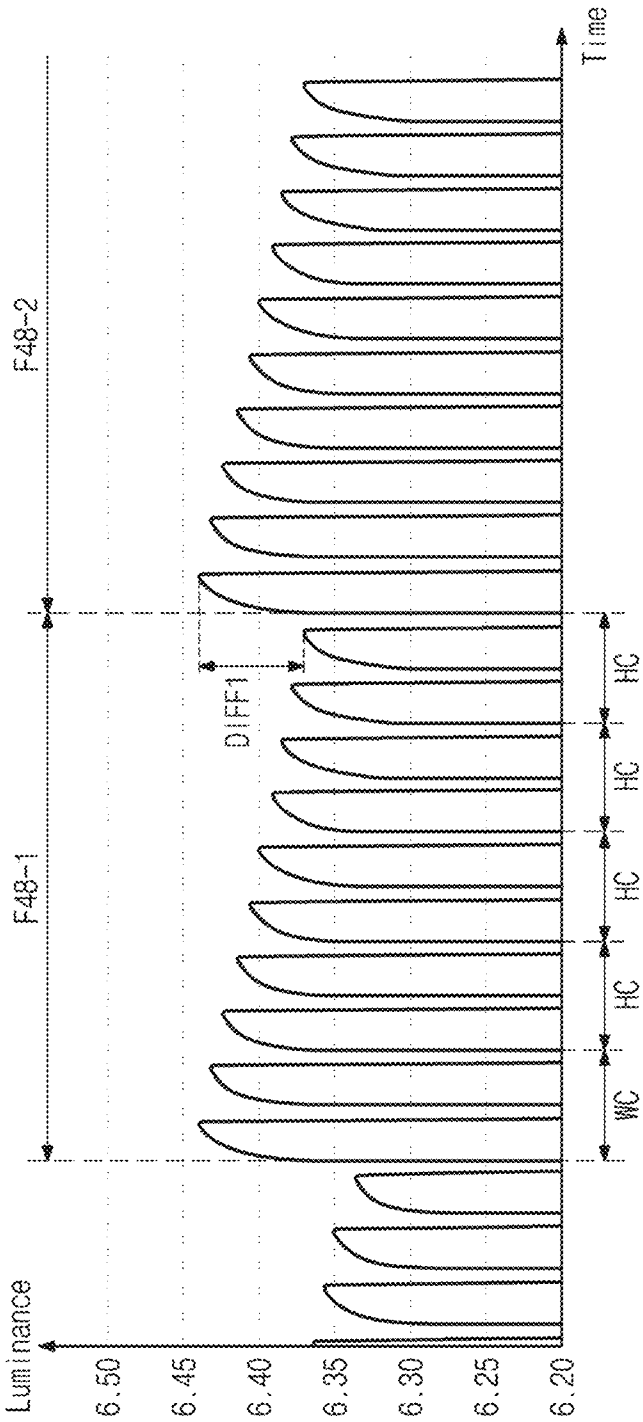
FIG. 5A shows a luminance change of a display panel when an operating frequency of a display device is 48 Hz.

FIG. 5A shows a luminance change of a display panel when an operating frequency of the display device DD is 48 Hz.

Figure 5B:
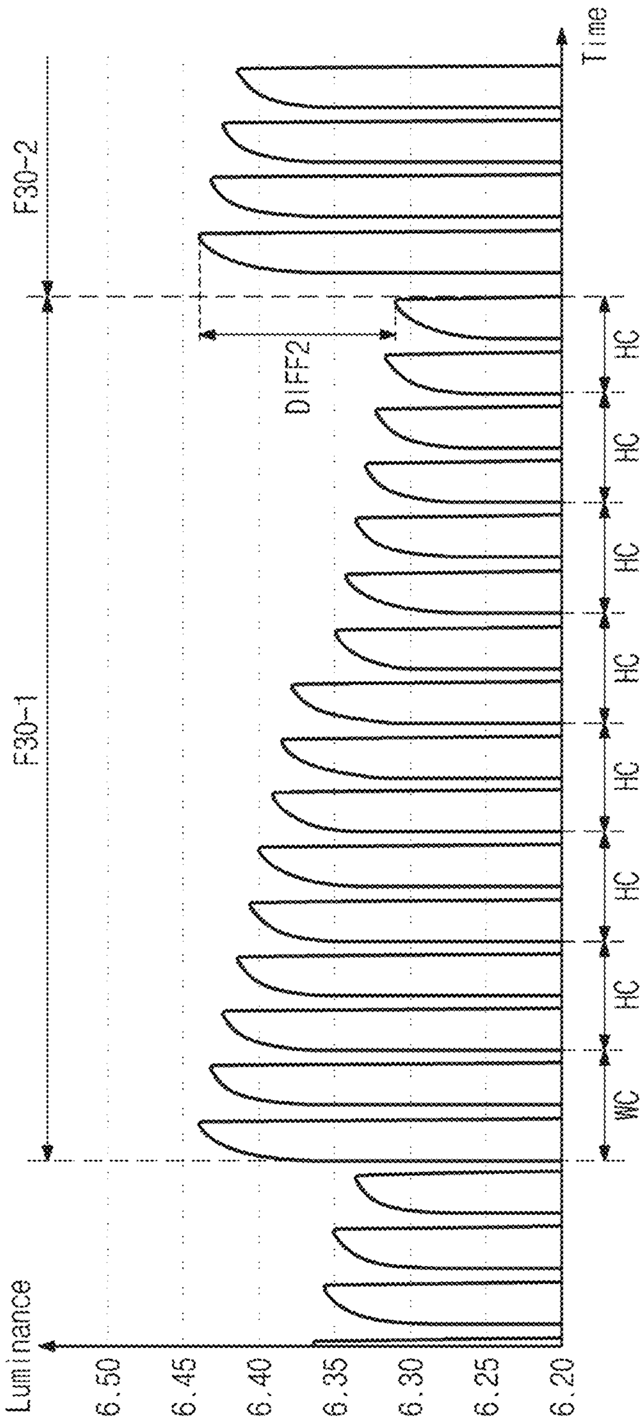
FIG. 5B shows a luminance change of a display panel when an operating frequency of a display device is 30 Hz.

FIG. 5B shows a luminance change of a display panel when an operating frequency of the display device DD is 30 Hz.

FIGS. 5A and 5B show a luminance change of a display panel when the emission signal EMj (see FIG. 2) transitions to an active level twice during the write cycle WC and each of the hold cycles HC.

Referring to FIGS. 1, 2, 4A, 4B, 4C, 5A, and 5B, the scan signals GW1 to GWn are maintained at inactive levels during the hold cycle HC. Accordingly, the pixel PXij does not receive the data signal Di, and the light emitting element ED emits light by charges charged in the capacitors C1 and C2.

The data signal Di received during the write cycle WC may be a first voltage level at a low grayscale (e.g., grayscale level of 0), and may be a second voltage level at a high grayscale (e.g., grayscale level of 255). In an embodiment, a first voltage level is 6 volts (V), and a second voltage level is 2 V.

When the data signal Di received during the write cycle WC is at the second voltage level of 2 V, a voltage level of the second node N2 may be increased by a leakage current through the third transistor T3. In particular, as the operating frequency decreases, the number of hold cycles HC in one frame increases.

As shown in FIG. 5A, when the operating frequency is 48 Hz, the number of hold cycles HC in one frame F48-1 is four. As shown in FIG. 5B, when the operating frequency is 30 Hz, the number of hold cycles HC in one frame F30-1 is seven.

As the number of hold cycles HC increases, the amount of leakage current through the third transistor T3 increases, and thus the voltage level of the second node N2 further increase. As a result, the luminance of the display panel DP is further reduced.

In an embodiment, as shown in FIG. 5A, while the operating frequency is 48 Hz, a difference value between the lowest luminance of the frame F48-1 and the highest luminance of a frame F48-2 may be a first value DIFF1.

In an embodiment, as shown in FIG. 5B, while the operating frequency is 30 Hz, a difference value between the lowest luminance of the frame F30-1 and the highest luminance of a frame F30-2 may be a second value DIFF2. In an embodiment, the second value DIFF2 is greater than the first value DIFF1. When a difference in luminance between frames is greater than a flicker reference value, a user may recognize a flicker. In an embodiment, the second value DIFF2 may be greater than a flicker reference value.

Figure 6:
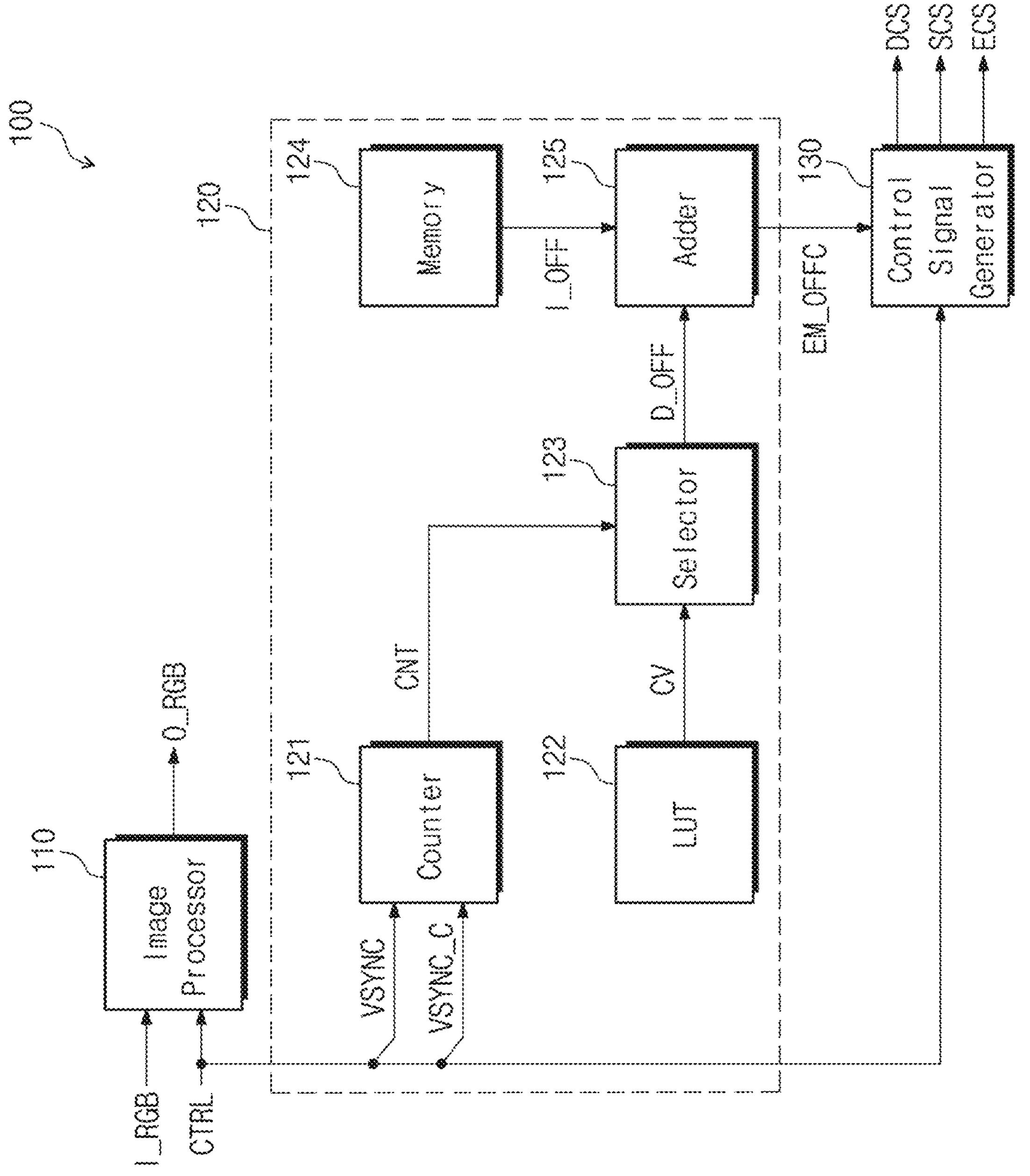
FIG. 6 is a block diagram of a driving controller, according to an embodiment of the disclosure.

FIG. 6 is a block diagram of a driving controller, according to an embodiment of the disclosure.

Referring to FIGS. 1, 3 and 6, an embodiment of the driving controller 100 includes an image processor 110, the emission controller 120, and a control signal generator 130.

The image processor 110 receives the input image signal I_RGB and the control signal CTRL. The image processor 110 converts the input image signal I_RGB to the output image signal O_RGB and then outputs the output image signal O_RGB to the data driving circuit 200.

The emission controller 120 outputs an emission off control signal EM_OFFC for controlling the emission off period EM_OFF of the emission signal EMj in response to a first synchronization signal VSYNC and a second synchronization signal VSYNC_C that are included in the control signal CTRL.

FIG. 6 illustrates an embodiment where the first synchronization signal VSYNC and the second synchronization signal VSYNC_C are included in the control signal CTRL, but the disclosure is not limited thereto. In an alternative embodiment, the first synchronization signal VSYNC and the second synchronization signal VSYNC_C may be independent of the control signal CTRL. In an embodiment, where the driving controller 100 includes a frequency discriminator that determines an operating frequency, the first synchronization signal VSYNC and the second synchronization signal VSYNC_C may be provided from the frequency discriminator.

The emission controller 120 includes a counter 121, a lookup table 122, a selector 123, a memory 124 and an adder 125.

The counter 121 is reset in response to the first synchronization signal VSYNC. The counter 121 counts up in response to the second synchronization signal VSYNC_C. That is, the counter 121 counts the number of second synchronization signals VSYNC_C and outputs a count signal CNT. In an embodiment, the first synchronization signal VSYNC may be a signal indicating the start of one frame, and the second synchronization signal VSYNC_C may be a signal indicating the start of driving cycles, that is, the write cycle WC and the hold cycles HC.

The lookup table 122 (also referred to as "LUT" in FIG. 6) stores a compensation value CV corresponding to the count signal CNT.

FIG. 7 shows the compensation value CV stored in the lookup table 122.

Referring to FIGS. 6 and 7, the lookup table 122 may store the compensation value CV corresponding to the count signal CNT. The compensation value CV may be a value for adjusting the emission off period EM_OFF during the hold cycle HC.

Referring back to FIGS. 3 and 6, the selector 123 reads the compensation value CV from the lookup table 122 in response to the count signal CNT. In an embodiment, for example, when the count signal CNT is 0, the compensation value CV may be 2. In an embodiment, for example, when the count signal CNT is 4, the compensation value CV may be 0. In an embodiment, for example, when the count signal CNT is 8, the compensation value CV may be −2.

The selector 123 outputs the compensation value CV, which is read from the lookup table 122, as a deviation value D_OFF.

The memory 124 stores an initial value I_OFF of the emission off period EM_OFF. The memory 124 may be a volatile memory or a register. In an embodiment, when being powered on, the memory 124 may store a setting value of the display device DD. The setting value of the display device DD may include the initial value I_OFF.

FIG. 6 illustrates an embodiment where the initial value I_OFF is stored in the memory 124, but the disclosure is not limited thereto. In an alternative embodiment, the initial value I_OFF may be included in the control signal CTRL, and may be provided to the adder 125. In an embodiment, the initial value I_OFF may be provided to the adder 125 from the outside independently of the control signal CTRL.

The adder 125 adds the initial value I_OFF from the memory 124 and the deviation value D_OFF from the selector 123, and then outputs the emission off control signal EM_OFFC to the control signal generator 130.

The control signal generator 130 receives the control signal CTRL and the emission off control signal EM_OFFC. The control signal generator 130 outputs the scan control signal SCS and the data control signal DCS based on the control signal CTRL. Moreover, the control signal generator 130 outputs the emission control signal ECS based on the control signal CTRL and the emission off control signal EM_OFFC.

Figure 8:
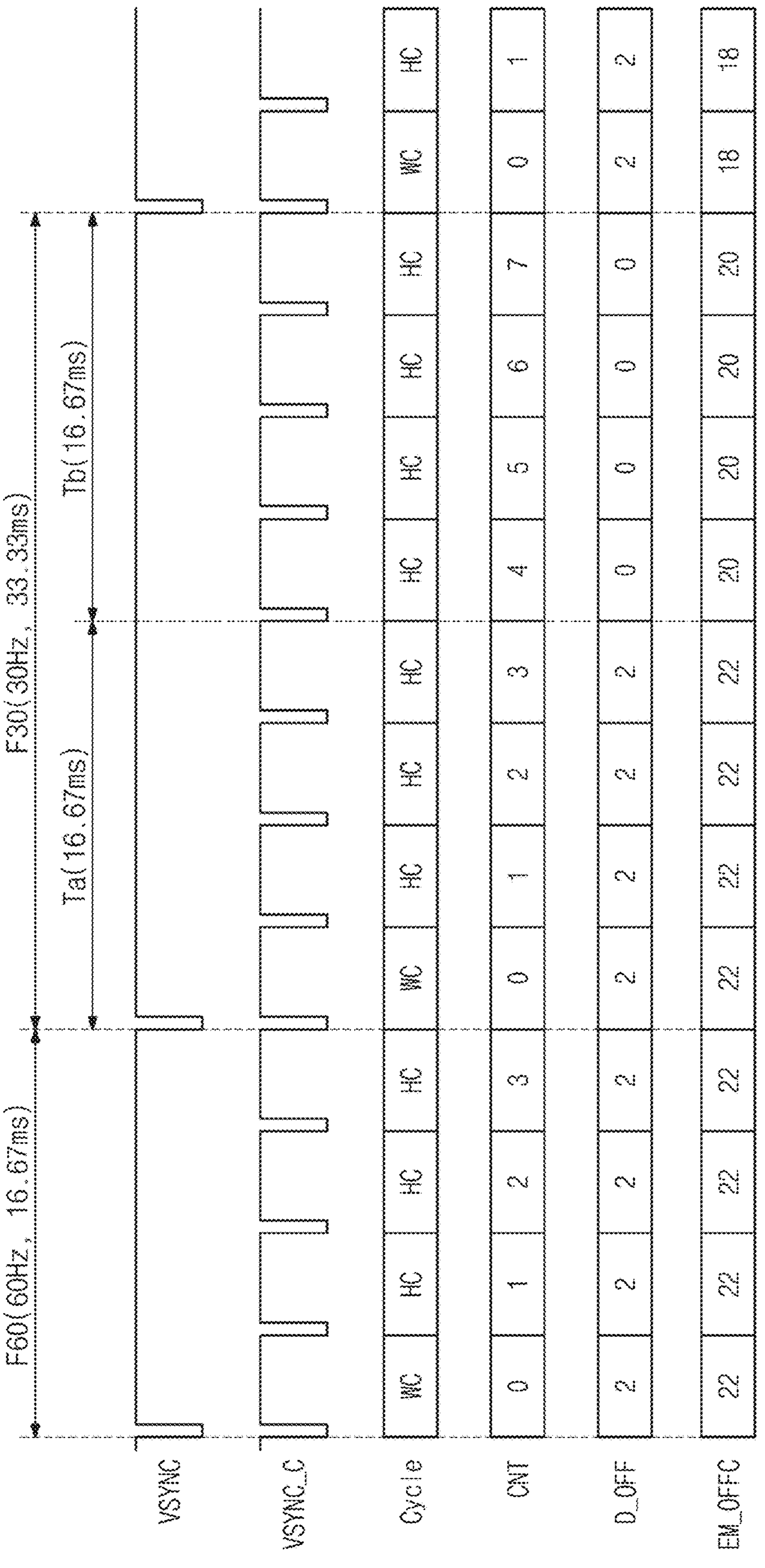
FIG. 8 shows a first synchronization signal, a second synchronization signal, a count signal, and an emission off control signal according to an operating frequency of a display device.

FIG. 8 shows the first synchronization signal VSYNC, the second synchronization signal VSYNC_C, the count signal CNT, and the emission off control signal EM_OFFC according to an operating frequency of the display device DD.

Referring to FIGS. 1, 6, and 8, in an embodiment, the counter 121 is reset to '0' in response to the first synchronization signal VSYNC, and counts up in response to the second synchronization signal VSYNC_C.

When the count signal CNT output from the counter 121 corresponds to 0, 1, 2, and 3 during the frame F60, during which an operating frequency of the display device DD is 60 Hz, the selector 123 may output 2, 2, 2, and 2 as the deviation value D_OFF. When the initial value I_OFF stored in the memory 124 is 20, the emission off control signal EM_OFFC output from the adder 125 is 22, 22, 22, or 22.

The control signal generator 130 outputs the emission control signal ECS such that the emission signal EMj having the emission off period EM_OFF of a time (i.e., 22 horizontal periods 22H) corresponding to the emission off control signal EM_OFFC is capable of being output. The emission driving circuit EDC shown in FIG. 1 may output emission signals, each of which has the emission off period EM_OFF of 22 horizontal periods 22H, to the emission control lines EML1 to EMLn in response to the emission control signal ECS.

When the count signal CNT output from the counter 121 corresponds to 0, 1, 2, or 3 during the frame F30, during which an operating frequency of the display device DD is 30 Hz, the selector 123 may output 2, 2, 2, or 2 as the deviation value D_OFF. When the initial value I_OFF stored in the memory 124 is 20, the emission off control signal EM_OFFC output from the adder 125 is 22, 22, 22, or 22.

The control signal generator 130 outputs the emission control signal ECS in response to the emission off control signal EM_OFFC such that the emission signal EMj having the emission off period EM_OFF of a time (i.e., 22 horizontal periods 22H) corresponding to the emission off control signal EM_OFFC is capable of being output.

When the count signal CNT output from the counter 121 corresponds to 4, 5, 6, or 7, the selector 123 may output 0, 0, 0, or 0 as the deviation value D_OFF. When the initial value I_OFF stored in the memory 124 is 20, the emission off control signal EM_OFFC output from the adder 125 is 20, 20, 20, or 20.

The control signal generator 130 outputs the emission control signal ECS in response to the emission off control signal EM_OFFC such that the emission signal EMj having the emission off period EM_OFF of 20 horizontal periods 20H is capable of being output.

In such an embodiment, the emission driving circuit EDC, as shown in FIGS. 1 and 8, may output emission signals, each of which has the emission off period EM_OFF of 22 horizontal periods 22H during a first period Ta of the frame F30, to the emission control lines EML1 to EMLn in response to the emission control signal ECS. The emission driving circuit EDC may output emission signals, each of which has the emission off period EM_OFF of 20 horizontal periods 20H, to the emission control lines EML1 to EMLn in response to the emission control signal ECS during a second period Tb of the frame F30, which is continuous with (or immediately subsequent to) the first period Ta.

When the emission off period EM_OFF of the emission signal EMj decreases from 22 horizontal periods 22H to 20 horizontal periods 20H, the emission on period EM_ON is relatively long by 2H. When the emission on period EM_ON increases, the emission time of the pixel PXij increases. Accordingly, the luminance degradation described above with reference to FIG. 5B may be compensated.

In an embodiment, the first period Ta corresponds to four driving cycles, that is, the one write cycle WC and the three hold cycles HC. The second period Tb corresponds to four driving cycles, that is, the four hold cycles HC. The first period Ta and the second period Tb may be determined by the compensation value CV of the lookup table 122 shown in FIG. 7.

In an embodiment, the first period Ta is 16.67 milliseconds (ms), and the second period Tb is 16.67 ms. However, the disclosure is not limited thereto.

Figure 9:
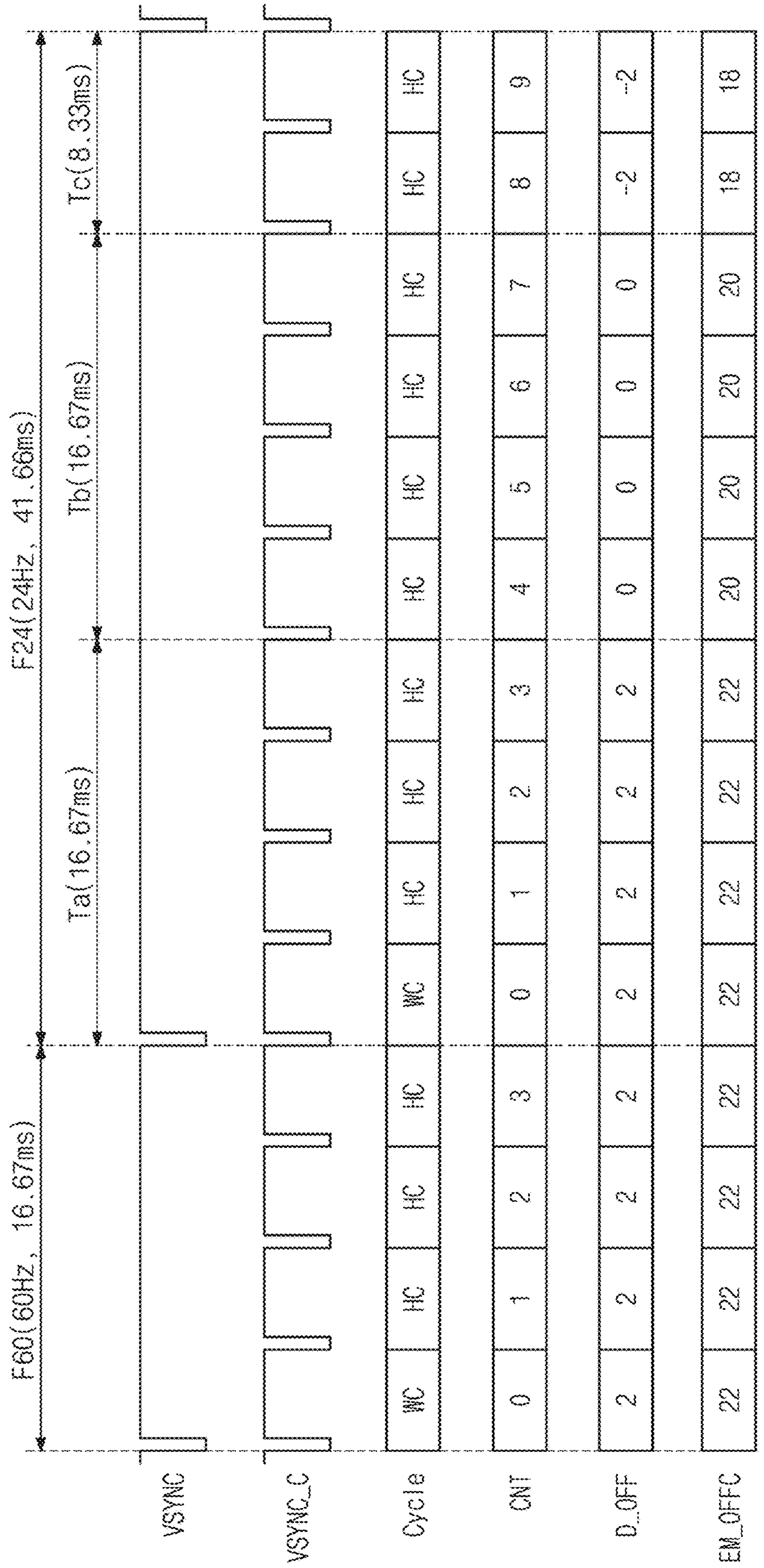
FIG. 9 shows a first synchronization signal, a second synchronization signal, a count signal, and an emission off control signal according to an operating frequency of a display device.

FIG. 9 shows the first synchronization signal VSYNC, the second synchronization signal VSYNC_C, the count signal CNT, and the emission off control signal EM_OFFC according to an operating frequency of the display device DD.

Referring to FIGS. 1, 6, and 9, in an embodiment, the counter 121 is reset to '0' in response to the first synchronization signal VSYNC, and counts up in response to the second synchronization signal VSYNC_C.

When the count signal CNT output from the counter 121 corresponds to 0, 1, 2, and 3 during the frame F60, during which an operating frequency of the display device DD is 60 Hz, the selector 123 may output 2, 2, 2, and 2 as the deviation value D_OFF. When the initial value I_OFF stored in the memory 124 is 20, the emission off control signal EM_OFFC output from the adder 125 is 22, 22, 22, or 22.

When the count signal CNT output from the counter 121 corresponds to 0, 1, 2, or 3 during the frame F24, during which an operating frequency of the display device DD is 24 Hz, the selector 123 may output 2, 2, 2, or 2 as the deviation value D_OFF. When the initial value I_OFF stored in the memory 124 is 20, the emission off control signal EM_OFFC output from the adder 125 is 22, 22, 22, or 22.

When the count signal CNT output from the counter 121 corresponds to 4, 5, 6, or 7, the selector 123 may output 0, 0, 0, or 0 as the deviation value D_OFF. When the initial value I_OFF stored in the memory 124 is 20, the emission off control signal EM_OFFC output from the adder 125 is 20, 20, 20, or 20.

When the count signal CNT output from the counter 121 corresponds to 8 or 9, the selector 123 may output −2 or −2 as the deviation value D_OFF. When the initial value I_OFF stored in the memory 124 is 20, the emission off control signal EM_OFFC output from the adder 125 is 18 or 18.

The control signal generator 130 outputs the emission control signal ECS based on the emission off control signal EM_OFFC.

In such an embodiment, the emission driving circuit EDC as shown in FIGS. 1 and 9, may output emission signals, each of which has the emission off period EM_OFF of 22 horizontal periods 22H during the first period Ta of the frame F24, the emission off period EM_OFF of 20 horizontal periods 20H during the second period Tb of the frame F24, and the emission off period EM_OFF of 18 horizontal periods 18H during a third period Tc of the frame F24, which is continuous with (or immediately subsequent to) the second period Ta, to the emission control lines EML1 to EMLn in response to the emission control signal ECS.

When the emission off period EM_OFF of the emission signal EMj decreases from 22 horizontal periods 22H to 20 horizontal periods 20H, and then decreases again from 20 horizontal periods 20H to 18 horizontal periods 18H, the emission on period EM_ON is longer than the first period Ta by 2H during the second period Tb, and is longer than the first period Ta by 4H during the third period Tc. When the emission on period EM_ON increases, the emission time of the pixel PXij increases. Accordingly, the luminance degradation described above with reference to FIG. 5B may be compensated.

In an embodiment, the first period Ta is 16.67 ms, the second period Tb is 16.67 ms, and the third period Tc is 8.33 ms, but the disclosure is not limited thereto.

FIG. 8 shows a case where the frame F30 has an operating frequency of 30 Hz, and FIG. 9 shows a case where the frame F24 has an operating frequency of 24 Hz. However, the disclosure is not limited thereto. When the operating frequency is lower than 30 Hz, for example, when the operating frequency is 15 Hz, 10 Hz, 8 Hz, 4 Hz, or 1 Hz, the emission off period EM_OFF of the emission signal EMj may be adjusted similarly to those shown in FIGS. 8 and 9.

Figure 10:
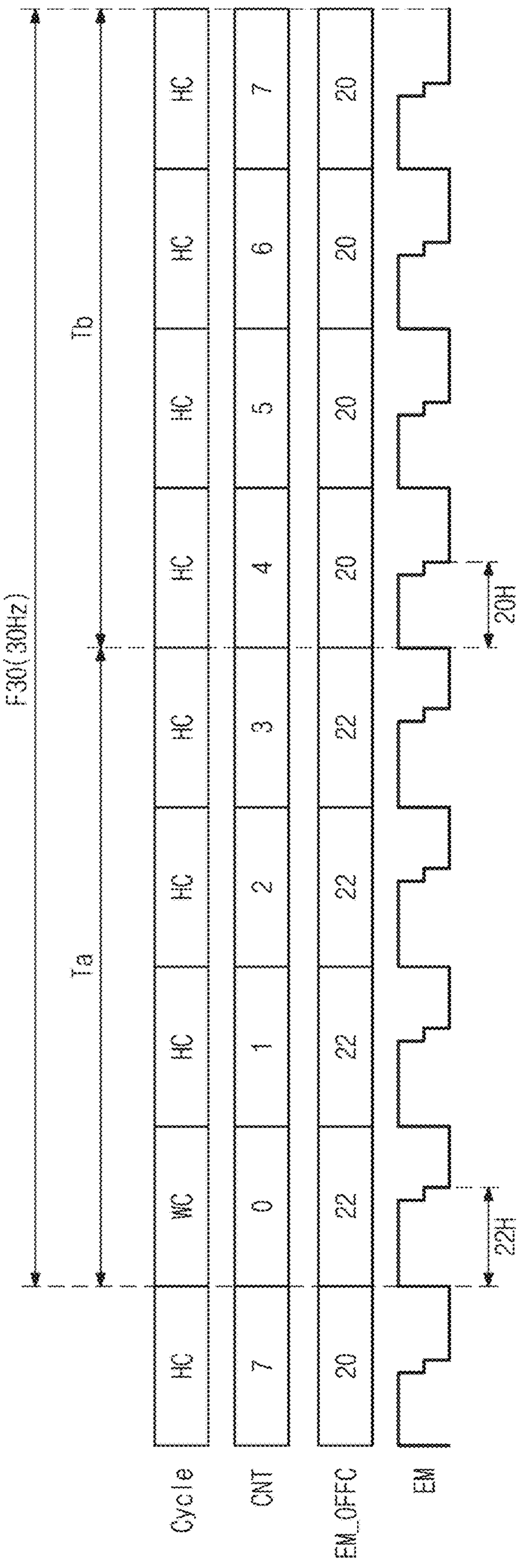
FIG. 10 shows an emission off period of an emission signal when an operating frequency of a display device is 30 Hz.

FIG. 10 shows the emission off period EM_OFF of the emission signal EMj when the operating frequency of the display device DD is 30 Hz.

Referring to FIGS. 1, 6, and 10, when the operating frequency is 30 Hz, the frame F30 may include the one writes cycle WC and the seven hold cycles HC.

When the initial value I_OFF is 20 and the count signal CNT of the counter 121 is 0, 1, 2, or 3, the deviation value D_OFF is 2, 2, 2, or 2, and the emission off control signal EM_OFFC is 22, 22, 22, or 22.

When the initial value I_OFF is 20 and the count signal CNT of the counter 121 is 4, 5, 6, or 7, the deviation value D_OFF is 0, 0, 0, or 0, and the emission off control signal EM_OFFC is 20, 20, 20, or 20.

Accordingly, during the first period Ta in the frame F30, the emission off period EM_OFF of the emission signal EMj may be 22 horizontal periods 22H. During the second period Tb in the frame F30, the emission off period EM_OFF of the emission signal EMj may be 20 horizontal periods 20H.

Figure 11:
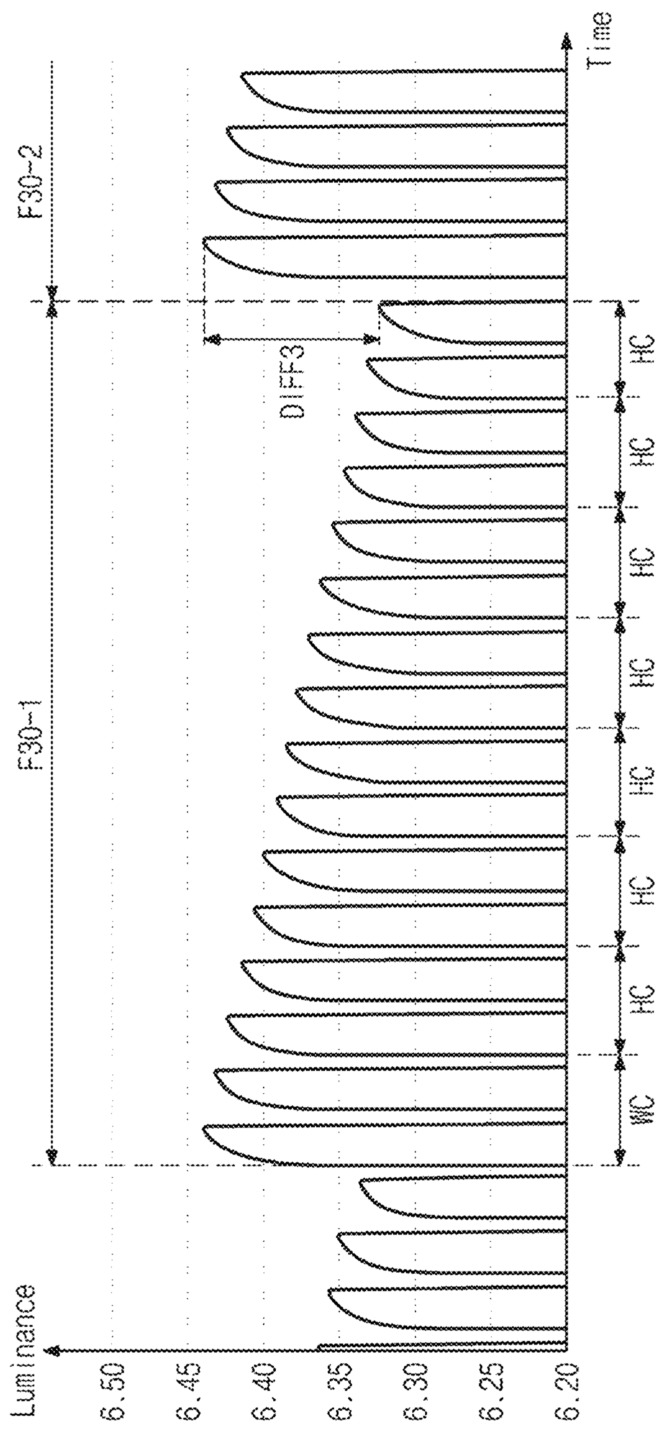
FIG. 11 shows a luminance change of a display panel when an operating frequency of a display device is 30 Hz.

FIG. 11 shows a luminance change of a display panel when an operating frequency of the display device DD is 30 Hz.

As shown in FIG. 11, while the operating frequency is 30 Hz, a difference value between the lowest luminance of the frame F30-1 and the highest luminance of the frame F30-2 may be a third value DIFF3.

In an embodiment, the third value DIFF3 is less than the second value DIFF2 shown in FIG. 5B. In an embodiment, the third value DIFF3 may be less than a flicker reference value.

In an embodiment, as described above with reference to FIGS. 6 to 10, when the operating frequency is 30 Hz, the emission off period EM_OFF of the emission signal EMj in the first period Ta may be 22 horizontal periods 22H, and the emission off period EM_OFF of the emission signal EMj in the second period Tb may be 20 horizontal periods 20H.

As the emission off period EM_OFF of the emission signal EMj increases during the second period Tb, the emission time of the pixel PXij increases. Accordingly, the luminance degradation of a high grayscale image at a low operating frequency (e.g., 30 Hz) may be compensated.

In embodiments of the invention, when the number of hold cycles is greater than a reference value, a display device may adjust the emission time of a light emitting element by changing an emission off period of an emission control signal. Accordingly, even though a frequency of an input image signal is lowered, the light intensity of a light emitting element may be maintained uniformly, such that a change in luminance due to a change in frequency of the input image signal may be effectively prevented or substantially reduced.

The invention should not be construed as being limited to the embodiments set forth herein. Rather, these embodiments are provided so that this disclosure will be thorough and complete and will fully convey the concept of the invention to those skilled in the art.

While the invention has been described with reference to embodiments thereof, it will be understood by those of ordinary skill in the art that various changes in form and details may be made herein without departing from the spirit or scope of the invention as defined by the following claims.

What is claimed is:

1. A display device comprising:

a light emitting element;

a first transistor;

a second transistor connected between the first transistor and the light emitting element and including a gate electrode which receives an emission signal; and a driving controller which outputs an emission control signal in response to a first synchronization signal and a second synchronization signal, wherein the emission control signal is output in response to an emission off control signal which is based on a compensation value corresponding to a count signal, wherein one frame includes a first period and a second period continuous with the first period, wherein the one frame includes a plurality of driving cycles, each of which includes an emission on period and an emission off period, wherein the plurality of driving cycles includes a write cycle and a plurality of hold cycles, wherein the driving controller includes a counter which resets in response to the first synchronization signal and counts up in response to the second synchronization signal, and outputs the count signal, wherein the first synchronization signal indicates a start of the one frame, and the second synchronization signal indicates a start of each of the plurality of driving cycles, and wherein an emission off period of the emission signal has a first time duration during the first period, and the emission off period of the emission signal has a second time duration different from the first time duration during the second period.

2. The display device of claim 1, wherein the second transistor is turned off during the emission off period of the emission signal.

3. The display device of claim 1, wherein the second time duration is shorter than the first time duration.

4. The display device of claim 1, further comprising:

an emission driving circuit which outputs the emission signal in response to the emission control signal.

5. The display device of claim 4, wherein the driving controller further includes:

a lookup table which stores the compensation value;

a selector which outputs the compensation value corresponding to the count signal as a deviation value;

an adder which adds an initial value and the deviation value and outputs emission off control signal; and a control signal generator which outputs the emission control signal in response to the emission off control signal.

6. The display device of claim 5, further comprising:

a memory which stores the initial value.

7. The display device of claim 1, wherein the first period corresponds to a part of the plurality of driving cycles, and the second period corresponds to another part of the plurality of driving cycles.

8. The display device of claim 1, wherein, when an operating frequency is a first frequency, the one frame includes the first period and the second period, wherein, when the operating frequency is a second frequency lower than the first frequency, the one frame includes the first period, the second period, and a third period continuous with the second period, and wherein the emission off period of the emission signal during the third period has a third time duration different from the first time duration and the second time duration.

9. A display device comprising:

a display panel including a pixel connected to a scan line, an emission control line, and a data line;

a scan driving circuit which outputs a scan signal to the scan line;

an emission driving circuit which outputs an emission signal to the emission control line; and a driving controller which provides a scan control signal to the scan driving circuit and provides an emission control signal to the emission driving circuit, wherein one frame includes a write cycle and a plurality of hold cycles, wherein each of the write cycle and the plurality of hold cycles includes an emission on period and an emission off period, wherein the driving controller includes an emission controller which outputs the emission control signal in response to a first synchronization signal and a second synchronization signal, wherein the emission control signal is output in response to an emission off control signal which is based on a compensation value corresponding to a count signal, wherein the emission controller includes a counter which resets in response to the first synchronization signal and counts up in response to the second synchronization signal and outputs the count signal, wherein the first synchronization signal indicates a start of the one frame, and the second synchronization signal indicates a start of the write cycle and a start of each of the plurality of hold cycles, and wherein the driving controller outputs the emission control signal in a way such that an emission off period of the emission signal has a first time duration during the write cycle and at least one hold cycle of the plurality of hold cycles and the emission off period of the emission signal has a second time duration different from the first time duration during remaining hold cycles of the plurality of hold cycles.

10. The display device of claim 9, wherein the pixel includes:

a light emitting element;

a first transistor; and a second transistor connected between the first transistor and the light emitting element and including a gate electrode which receives the emission signal.

11. The display device of claim 10, wherein the second transistor is turned off by the emission signal during the emission off period of each of the write cycle and the plurality of hold cycles.

12. The display device of claim 10, wherein, during each of the write cycle and the plurality of hold cycles, the second transistor is turned off by the emission signal and the second transistor is turned on by the emission signal.

13. The display device of claim 9, wherein the second time duration is shorter than the first time duration.

14. The display device of claim 9, wherein the emission controller further includes:

a lookup table which stores the compensation value;

a selector which outputs the compensation value corresponding to the count signal as a deviation value;

an adder which adds an initial value and the deviation value and outputs the emission off control signal; and a control signal generator which outputs the emission control signal in response to the emission off control signal.

15. The display device of claim 14, wherein the emission controller further includes a memory which stores the initial value.

* * * * *